United States Patent
Mabuchi et al.

(10) Patent No.: US 7,243,311 B2
(45) Date of Patent: Jul. 10, 2007

(54) METHOD AND APPARATUS FOR SUPPORTING DEVELOPMENT OF INTEGRATED CIRCUIT AND A TRANSACTIONAL BUSINESS METHOD INVOLVING CONTRACTING AND LICENSING

(75) Inventors: Shigeki Mabuchi, Kyoto (JP); Masanori Fujisawa, Kyoto (JP)

(73) Assignee: Rohm Co., Ltd. (JP)

( * ) Notice: Subject to any disclaimer, the term of this patent is extended or adjusted under 35 U.S.C. 154(b) by 204 days.

(21) Appl. No.: 10/857,278

(22) Filed: May 28, 2004

(65) Prior Publication Data
US 2005/0278267 A1  Dec. 15, 2005

(51) Int. Cl.
*G06F 17/50* (2006.01)
(52) U.S. Cl. ......................................... 716/1
(58) Field of Classification Search ................. 716/18, 716/1; 705/1, 500
See application file for complete search history.

(56) References Cited

U.S. PATENT DOCUMENTS

| | | | |
|---|---|---|---|
| 6,157,947 A * | 12/2000 | Watanabe et al. ........... | 709/217 |
| 6,269,467 B1 * | 7/2001 | Chang et al. .................. | 716/1 |
| 6,594,799 B1 * | 7/2003 | Robertson et al. ............. | 716/1 |
| 6,634,008 B1 * | 10/2003 | Dole .............................. | 716/1 |
| 6,654,945 B1 * | 11/2003 | Nakayama et al. ........... | 716/18 |
| 6,668,360 B1 * | 12/2003 | Liu ................................ | 716/4 |
| 6,851,094 B1 * | 2/2005 | Robertson et al. ............. | 716/1 |
| 6,928,334 B2 * | 8/2005 | Kuo ............................. | 700/115 |
| 2004/0128641 A1 * | 7/2004 | Broberg et al. ................ | 716/18 |
| 2004/0162627 A1 * | 8/2004 | Minami et al. ............. | 700/107 |
| 2004/0199885 A1 * | 10/2004 | Lu et al. ......................... | 716/5 |
| 2004/0268283 A1 * | 12/2004 | Perry et al. ................... | 716/11 |
| 2005/0185440 A1 * | 8/2005 | Kawanaka .................... | 365/72 |
| 2006/0075374 A1 * | 4/2006 | McElvain ..................... | 716/17 |
| 2006/0116966 A1 * | 6/2006 | Pedersen et al. ............. | 705/59 |

FOREIGN PATENT DOCUMENTS

| | | |
|---|---|---|
| JP | 08-036558 | 2/1996 |
| JP | 2003-022378 | 1/2003 |

OTHER PUBLICATIONS

Ratzlaff et al. 'RICE: Rapid Interconnect Circuit Evaluator', 28th ACM/IEEE Design Automation Conference, 1991, pp. 555-560.*
Office Action for Japanese Application No. 2003-133755 dated Apr. 24, 2007.

* cited by examiner

*Primary Examiner*—Jack Chiang
*Assistant Examiner*—Suchin Parihar
(74) *Attorney, Agent, or Firm*—Cantor Colburn LLP (57) ABSTRACT

A technology for promoting distribution of IPs which constitute part of an integrated circuit is provided. An LSI maker concludes a contract for business alliance with an IP provider, acquires data on IPs from the IP provider, conducts layout, wiring, and verification of the acquired IPs, registers verified IPs into a library, and presents the same to a set maker. When the set maker orders for manufacturing of an LSI to the LSI maker, the LSI maker designs the logic of the integrated circuit, conducts layout, wiring, and timing simulation, and have evaluations from the set maker. Then, the LSI maker manufactures LSIs, delivers the same to the set maker, and receives the payment. The LSI maker calculates license fees, and pays them to the IP provider.

4 Claims, 5 Drawing Sheets

| ID 180 | FILENAME 182 | PROVIDER 184 | FUNCTION DESCRIPTION 186 | LICENSE RATE 188 |
|---|---|---|---|---|
| 1 | a.hdl | A | MELODY GENERATION | 3 YEN PER PIECE |
| 2 | b.hdl | B | A/D CONVERTER | 2% |
| .. | .. | .. | .. | .. |

FIG.5

METHOD AND APPARATUS FOR SUPPORTING DEVELOPMENT OF INTEGRATED CIRCUIT AND A TRANSACTIONAL BUSINESS METHOD INVOLVING CONTRACTING AND LICENSING

BACKGROUND OF THE INVENTION

1. Field of the Invention

The present invention relates to a technology for supporting development of an integrated circuit. In particular, the invention relates to a system, a method, and an apparatus for supporting development of an integrated circuit which includes functional blocks having predetermined functions provided in advance.

2. Description of the Related Art

Various types of electronic equipment including cellular phones, personal digital assistants (PDAs), personal computers, and CD players are now prevalent. These apparatuses are growing in performance year by year, with a reduction in size and weight as well. The miniaturization and sophistication, between which a tradeoff lies by nature, have been achieved together through the advance of semiconductor technologies.

The chief contributor historically is the fact that typical CPUs (Central Processing Units) have doubled in throughput every year. Nevertheless, higher integration achievable by CPUs alone have limitations naturally, and this has lead to the concept of SoC or "System on a Chip" in which not only a CPU but also the entire functions of an electronic device, including I/O circuits and the like, are mounted on a single chip. Under the circumstances, there are pervasive IP businesses that provide functional blocks for constituting SoCs or such very large scale integrated circuits in advance, and reuse and combine these to meet a variety of user needs speedily. IP stands for Intellectual Property, and by this expression the circuits for realizing individual functional blocks are regarded as intellectual properties. These properties are of importance for LSI makers to promote their products to set makers.

In recent years, semiconductor integrated circuits are growing in scale, and reductions are demanded of the development periods. The IP businesses are thus of increasing significance. To adopt operation-verified, field-proven IPs is an important technique in developing application specific integrated circuits (ASICs) which involve taking risks for development. In more and more cases, development and design of semiconductor integrated circuits involve not only reusing self-developed IPs but also procuring and utilizing IPs developed and provided by other companies at charge or at no charge. There are even emerging companies that are specialized in IP development. IP distribution businesses will be expanding in the future, and can be said to have the key to further advances of the semiconductor technologies. (For reference, see Japanese Patent Laid-Open Publication No. Hei 8-36558.)

Now, suppose that the specifications on input/output interfaces, control methods, and the like are not standardized at the time of developing IPs, or for example, a set maker procures IPs having predetermined functions from other companies in order to add the functions to LSIs to be mounted on electronic equipment. Then, it is often the case that the IPs have different combinations of input/output signal lines and different control methods from those of the LSIs to be incorporated. That is, the set maker cannot apply the IPs purchased from the IP-providing agent to their intended uses as is, but must tune them to the specifications of the LSIs to be incorporated. Tuning IPs and verifying operations on LSIs are delicate, sophisticated work which requires know-how, techniques, and experience. A lot of time and effort are thus needed. Set makers utilize IPs in order to enjoy such advantages as reduced development costs, shorter development periods, and operation stability. If the tuning operation impairs these advantages, it might contribute the hesitation of set makers in utilizing IPs.

In addition, many of venture businesses specialized in IP development posses no facility for manufacturing circuits actually. Even with excellent techniques for logic design, they have no means to verify the designs in actual circuits. Set makers have experienced the phenomena that logic data, when put into actual circuits, can fail to operate within specifications due to such problems as racing. It seems likely that the set makers thus consider it risky and hesitate to purchase field-unproven IPs from venture businesses that have no circuit manufacturing plant.

SUMMARY OF THE INVENTION

The present invention has been achieved in view of the foregoing. It is thus an object of the present invention to provide a technology for promoting IP distribution. Another object of the present invention is to provide a business model advantageous to all the three parties, i.e., IP providing agents, LSI manufacturing agents, and set makers.

One of the aspects of the present invention relates to a system for supporting development of an integrated circuit. This system for supporting development of an integrated circuit comprises: a terminal of a providing agent of a functional block having a predetermined function, the functional block constituting part of an integrated circuit; and a terminal of a manufacturing agent of an integrated circuit. The terminal of the providing agent provides logic data on the functional block to the terminal of the manufacturing agent over a network based on a contract concluded with the manufacturing agent. The terminal of the manufacturing agent comprises: a verification unit which acquires the logic data, conducts layout, wiring, and verification on an integrated circuit of a predetermined process, and registers the verified functional block into a library; a design unit which presents the functional block registered in the library to a purchasing agent of the integrated circuit, and when it receives an order for an integrated circuit incorporating a functional block registered in the library from the purchasing agent, acquires logic data on the integrated circuit including the functional block, conducts layout, wiring, and verification on an integrated circuit of a predetermined process, and outputs verified wiring data; and a calculation unit which calculates a license fee of the functional block to be paid to the providing agent based on the contract when the integrated circuit is paid for by the purchasing agent.

For example, the providing agent may be an IP provider, or a developing agent of IPs. The manufacturing agent may be an LSI maker, and the purchasing agent may be a set maker. The functional block having a predetermined function may be the IP mentioned above, for example. Here, the LSI maker tunes the IPs developed by the IP provider to LSIs of predetermined processes, conducts operation verification, and provides the resultant to the set maker. The set maker is thus freed from IP tuning, and can readily utilize the IPs backed up by the verification of the LSI maker without worry. Moreover, the IP provider can commission the LSI maker, which has verification and sales capabilities, to tune and verify its IPs and to license the set maker. The LSI maker can register a number of IPs and present them to set makers, thereby enlarging the opportunities to promote its LSIs to a greater number of set makers. This achieves a "WIN-WIN-WIN model" advantageous to all the three parties, the IP provider, the LSI maker, and the set maker.

Another aspect of the present invention relates to a method for supporting development of an integrated circuit. This method for supporting development of an integrated circuit comprises causing a terminal of a providing agent of a functional block having a predetermined function, the functional block constituting part of an integrated circuit, to provide logic data on the functional block to a terminal of a manufacturing agent of an integrated circuit based on a contract concluded with the manufacturing agent; causing the terminal of the manufacturing agent to conduct layout, wiring, and verification on an integrated circuit of a predetermined process based on the logic data; causing the terminal of the manufacturing agent to register the verified functional block into a library; causing the terminal of the manufacturing agent to present the functional block registered in the library to a purchasing agent of an integrated circuit; causing a terminal of the purchasing agent to issue an order for manufacturing of an integrated circuit incorporating the functional block to the terminal of the manufacturing agent; causing the terminal of the manufacturing agent to conduct layout, wiring, and verification on an integrated circuit of a predetermined process based on the logic data on the integrated circuit including the functional block ordered; causing the terminal of the manufacturing agent to output verified wiring data; and causing the terminal of the manufacturing agent to calculate a license fee of the functional block to be paid to the providing agent.

Still another aspect of the present invention relates to an apparatus for supporting development of an integrated circuit. This apparatus for supporting development of an integrated circuit comprises: an acquisition unit which acquires logic data on a functional block having a predetermined function from a providing agent of the functional blocks, the functional block constituting part of an integrated circuit; a first layout and wiring unit which conducts layout and wiring on an integrated circuit of a predetermined process based on the logic data; a first verification unit which verifies the layout and wiring by the first layout and wiring unit; a registration unit which registers the verified functional block into a library; and a presentation unit which presents the functional block registered in the library to a purchasing agent of an integrated circuit.

The apparatus for supporting development of an integrated circuit may further comprise: an order reception unit which receives an order for an integrated circuit including a functional block registered in the library from the purchasing agent; a second layout and wiring unit which acquires logic data on the integrated circuit including the functional block, and conducts layout and wiring on an integrated circuit of a predetermined process; a second verification unit which verifies the layout and wiring by the second layout and wiring unit; and an output unit which outputs data on the verified layout and wiring.

The apparatus for supporting development of an integrated circuit may further comprise: a condition storing unit which stores a condition for calculating a license fee of the functional block; and a calculation unit which calculates a license fee of the functional block incorporated in the integrated circuit ordered from the purchasing agent based on the calculation condition.

Incidentally, any combinations of the foregoing components, and the expressions of the present invention converted among methods, apparatuses, systems, recording media, computer programs, and the like are also intended to constitute applicable aspects of the present invention.

Moreover, this summary of the invention does not necessarily describe all necessary features so that the invention may also be sub-combination of these described features.

DETAILED DESCRIPTION OF THE INVENTION

The invention will now be described based on preferred embodiments which do not intend to limit the scope of the present invention but exemplify the invention. All of the features and the combinations thereof described in the embodiments are not necessarily essential to the invention.

Figure 1:
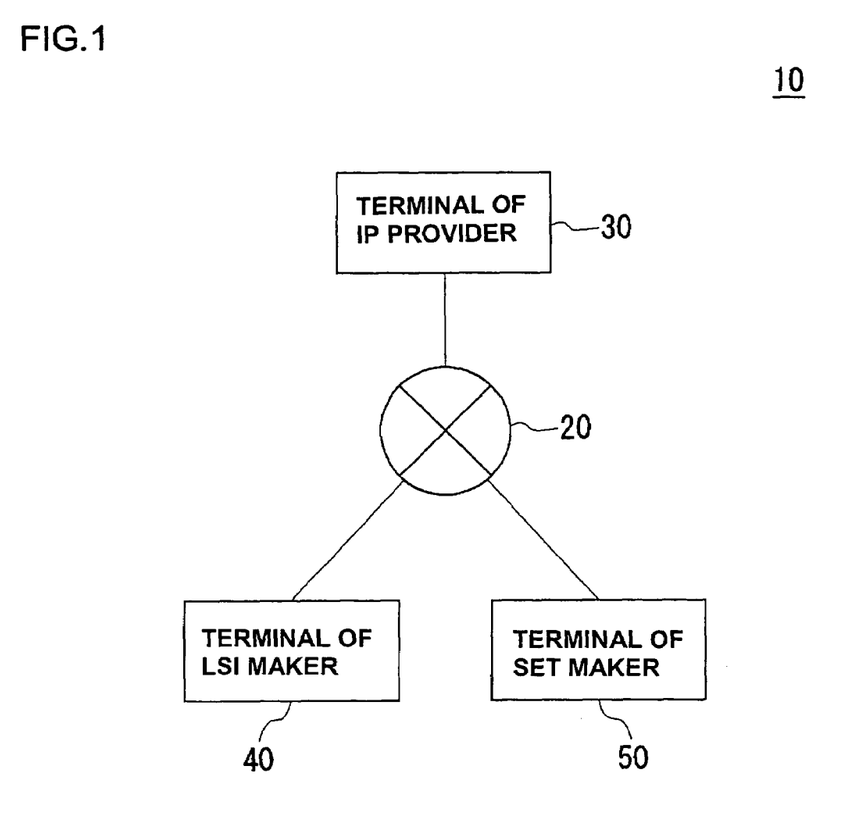
FIG. 1 is a diagram showing the overall configuration of an integrated circuit development support system according to an embodiment.

FIG. 1 shows the overall configuration of an integrated circuit development support system 10 according to an embodiment. In the integrated circuit development support system 10, a terminal of an IP provider 30, a terminal of an LSI maker 40, and a terminal of a set maker 50 are connected over the Internet 20, an example of network. The IP provider 30 is an agent for developing and providing IPs. The LSI maker 40 is an agent for designing and manufacturing LSIs. The set maker 50 is an agent for purchasing and utilizing the LSIs. Hereinafter, the simple term "IP provider" shall refer to either of the IP provider itself and the terminal of the IP provider with no particular distinction. Similarly, the LSI maker itself and the terminal of the LSI maker, and the set maker itself and the terminal of the set maker, will be referred to as "LSI maker" and "set maker," respectively, with no particular distinction. The terminal of the LSI maker 40 has the functions of the apparatus for supporting development of an integrated circuit.

In the integrated circuit development support system 10 of the present embodiment, the IP provider 30 and the LSI maker 40 are in business alliance with each other, and collaborate to expand their IP business. The LSI maker 40 in business alliance with the IP provider 30 procures IPs developed by the IP provider 30, tunes the IPs to the specifications of its own LSIs to manufacture, conducts layout, wiring, and timing simulation for operational verification, and registers verified IPs into a library. The LSI maker 40 can register not only its self-developed IPs but also those IPs procured from the business alliance IP provider 30, having a number of appealing functions, into its library and present them to the set maker 50. This makes a highly appealing feature to promote its products to the set maker 50.

From the viewpoint of the set maker 50, IPs actually verified in operation are provided by the LSI maker 40 which has know-how, experience, and technical capabilities for circuit design. The set maker 50 can thus utilize IPs having operational stability without worry, which yields the advantage of promising such effects as reduced development costs and shorter development periods. From the viewpoint of the IP provider 30, commissioning the LSI maker 40 to tune and verify the IPs can cover the drawback that the IP provider 30 cannot make actual circuits for verification by itself. Besides, commissioning the LSI maker 40, which has sales capabilities to set makers 50, to license for its IPs allows outsourcing of the sales department, with the advantage that its IPs can be licensed to a greater number of set makers 50. According to the integrated circuit development support system 10 of the present embodiment, excellent IP design technologies of the IP provider 30 and excellent development capabilities, verification capabilities, and sales capabilities of the LSI maker 40 can be fused together to promote IP distribution. As described above, the business model proposed in the present embodiment is one advantageous to all the three parties, i.e., the IP provider 30, the LSI maker 40, and the set maker 50.

Figure 2:
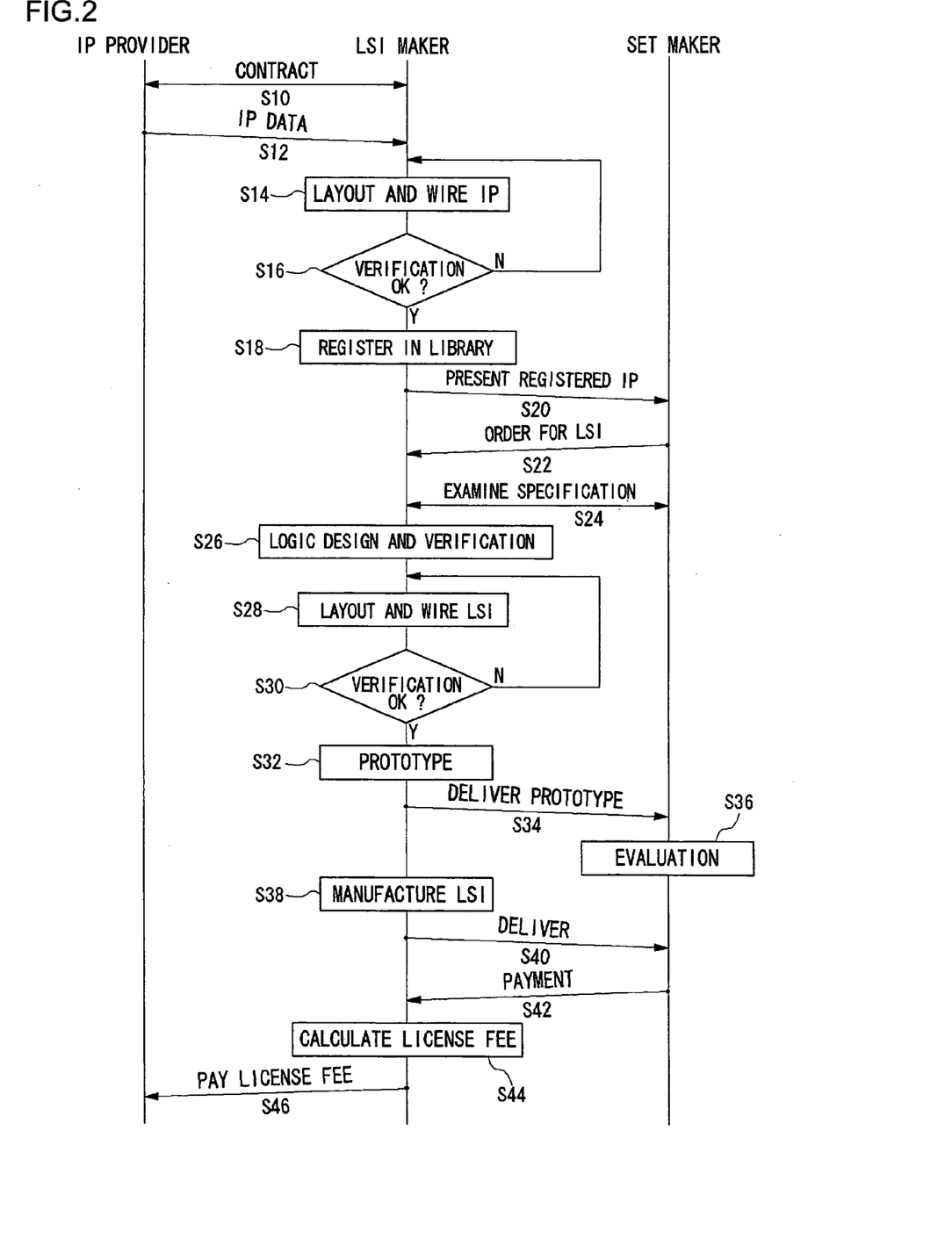
FIG. 2 is a sequence diagram schematically showing the flow of an IP distribution business according to the integrated circuit development support system.

FIG. 2 is a sequence diagram schematically showing the flow of the IP distribution business according to the integrated circuit development support system 10. Initially, the LSI maker 40 concludes a contract for business alliance with the IP provider 30 (S10). The contract may cover a confidential agreement between the two parties, contracts as to operation guarantees and maintenance, and a contract as to the method of calculating license fees when IPs are incorporated in LSIs. When the contract is signed, the IP provider 30 provides the LSI maker 40 with data on the IPs it has developed (S12). The IP data may be data which is described in a hardware description language (HDL), or net lists which show circuit diagram information in lists. When the LSI maker 40 acquires the IP data from the IP provider 30, it layouts and wires the IPs (S14) and conducts verification (timing simulation) after the layout and wiring (S16) in order to verify operations on its own LSI products. If the verification finds any error (N at S16), the layout and wiring are conducted again (S14). The layout, wiring, and timing simulation are repeated until it is verified that the circuits operate within specifications.

The verified IPs are registered into a library (S18), and presented to the set maker 50 (S20). When the set maker 50 orders design and manufacturing of an LSI from the LSI maker 40 (S22), the LSI maker 40 and the set maker 50 examine the specifications of the LSI (S24). Here, the LSI maker 40 may extract IPs that can achieve functions the set maker 50 desires from the library, and present the same to the set maker 50 for active promotion of IP utilization. When the LSI specifications are determined, the LSI maker 40 draws logic design of the IPs to be incorporated in the LSI and of the other circuits, and conducts logic verification (logic simulation) by using test patterns (S26).

When the logic verification is completed, layout and wiring (S28) and timing simulation (S30) are conducted on an LSI of the process conforming to the specifications. These steps are repeated until the result of verification satisfies the specifications (Y at S30). When the verification is completed, the LSI maker 40 prototypes the LSI (S32) and delivers the prototype to the set maker 50 (S34). The set maker 50 evaluates the delivered prototype (S36), and if necessary, redoes the designing operation including the layout, wiring, and timing simulation. When the evaluation is completed, the LSI maker 40 manufactures LSIs (S38), delivers them to the set maker 50 (S40), and receives the payment (S42). The LSI maker 40 calculates license fees based on the rates determined at the time of concluding the contract with the IP provider 30 (S44), and pays the IP provider 30 for the license fees (S46).

Figure 3:
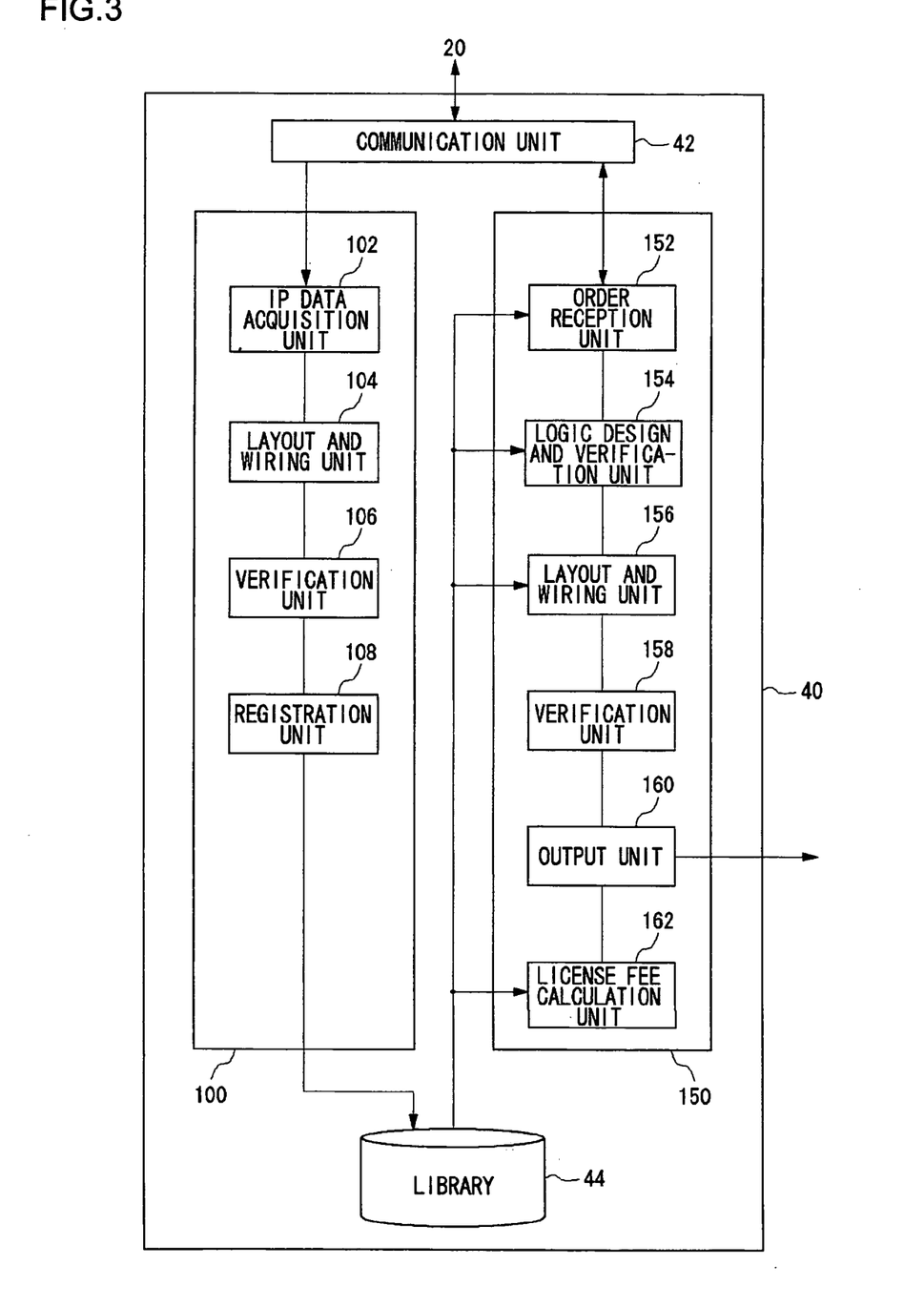
FIG. 3 is a diagram showing the internal configuration of an LSI maker terminal which is an example of the apparatus for supporting development of an integrated circuit.

FIG. 3 shows the internal configuration of the LSI maker terminal 40 which is an example of the apparatus for supporting development of an integrated circuit. The LSI maker terminal 40 chiefly comprises a communication unit 42, an IP verification unit 100, an LSI design unit 150, and a library 44. The communication unit 42 controls communication with other apparatuses over the Internet 20. The IP verification unit 100 acquires IP data from the IP provider 30 and verifies the same. The LSI design unit 150 designs and verifies LSIs in response to LSI orders from the set maker 50. The library 44 stores IPs verified by the IP verification unit 100. In the present embodiment, the library 44 contains the conditions for calculating license fees of the IPs. Thus, the library 44 also functions as a condition storing unit.

Figure 4:
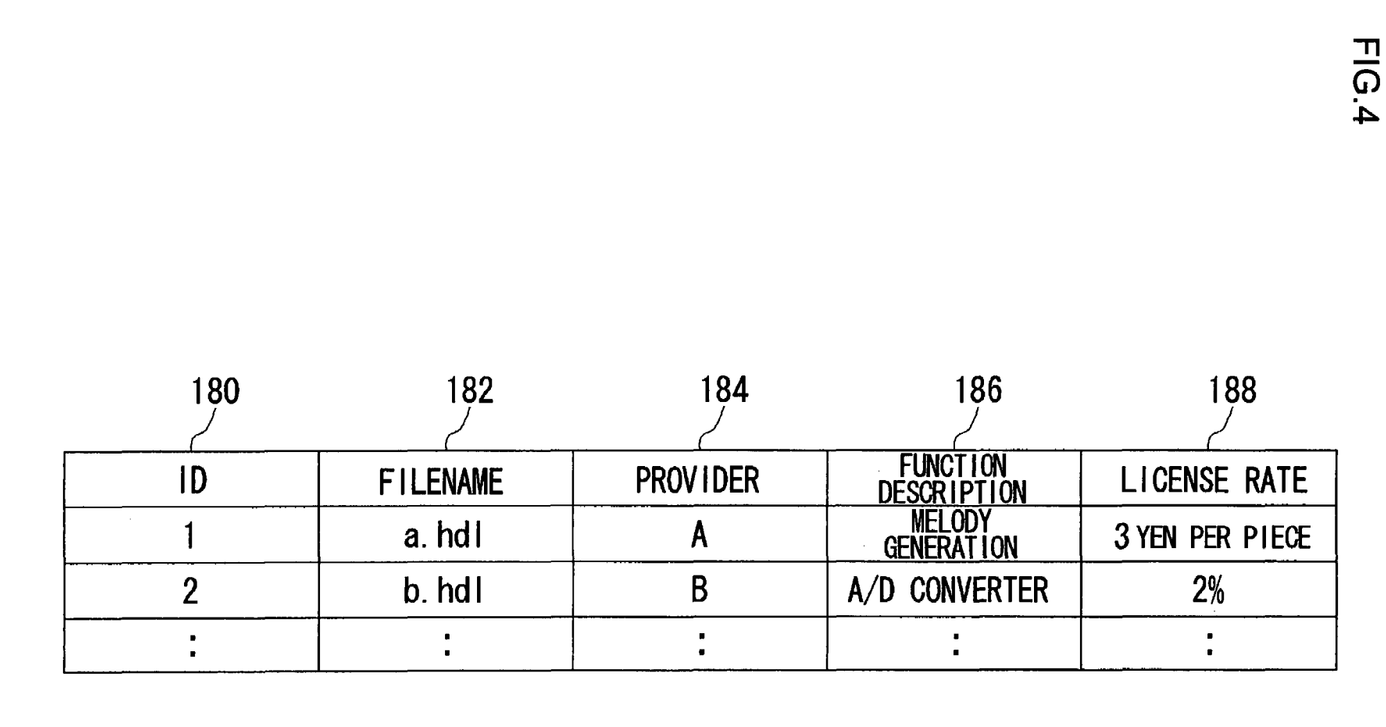
FIG. 4 is a chart showing an example of internal data on a management table for managing a library.

FIG. 4 shows an example of internal data on a management table for managing the library 44. The management table has an ID field 180, a filename field 182, a provider field 184, a function description field 186, and a license rate field 188. For example, IP information recorded with an ID of "1" includes "a.dhl" as the filename of the HDL data, "A" as the name of the provider or developer, "melody generation" as the description of the function, and "3 yen per piece" as the license rate.

The IP verification unit 100 comprises an IP data acquisition unit 102, a layout and wiring unit 104, a verification unit 106, and a registration unit 108. The IP data acquisition unit 102 acquires IP data from the terminal of the IP provider 30 over the Internet 20. The layout and wiring unit 104 conducts layout and wiring based on the IP data acquired. The verification unit 106 performs timing simulation by inputting predetermined test patterns to the circuit created by the layout and wiring unit 104, and verifies whether or not the output signals meet the specifications. If the verification finds that predetermined output signals are not obtained, the layout and wiring unit 104 conducts layout and wiring again. When the verification is completed, the registration unit 108 registers the IP into the library 44.

The LSI design unit 150 comprises an order reception unit 152, a logic design and verification unit 154, a layout and wiring unit 156, a verification unit 158, an output unit 160, and a license fee calculation unit 162. The order reception unit 152 receives an order for an LSI from the set maker 50. Here, the order reception unit 152 may present the IPs registered in the library 44 to the set maker 50. The order reception unit 152 may present the IPs and receive orders from the set maker 50 on Web pages. In this case, the LSI maker terminal 40 further comprises a configuration for functioning as a Web server. The logic design and verification unit 154 acquires the HDL sources designed to the specifications of the LSI ordered from the set maker 50, conducts logic synthesis, and performs logic simulation by using predetermined test patterns. The layout and wiring unit 156 conducts layout and wiring based on the logic-synthesized data. The verification unit 158 performs timing simulation by inputting predetermined test patterns to the circuit created by the layout and wiring unit 156, and verifies whether or not the output signals meet the specifications. If the verification finds that predetermined output signals are not obtained, the layout and wiring unit 156 conducts layout and wiring again. When the verification is completed, the output unit 160 outputs the wiring data.

The license fee calculation unit 162 reads the conditions for calculating the license fees of the IPs from the library 44, and calculates the license fees to be paid to the IP provider 30. For example, the license fees may be passed to the IP provider 30 when the LSI maker 40 receives the payment for the LSIs from the set maker 50.

Figure 5:
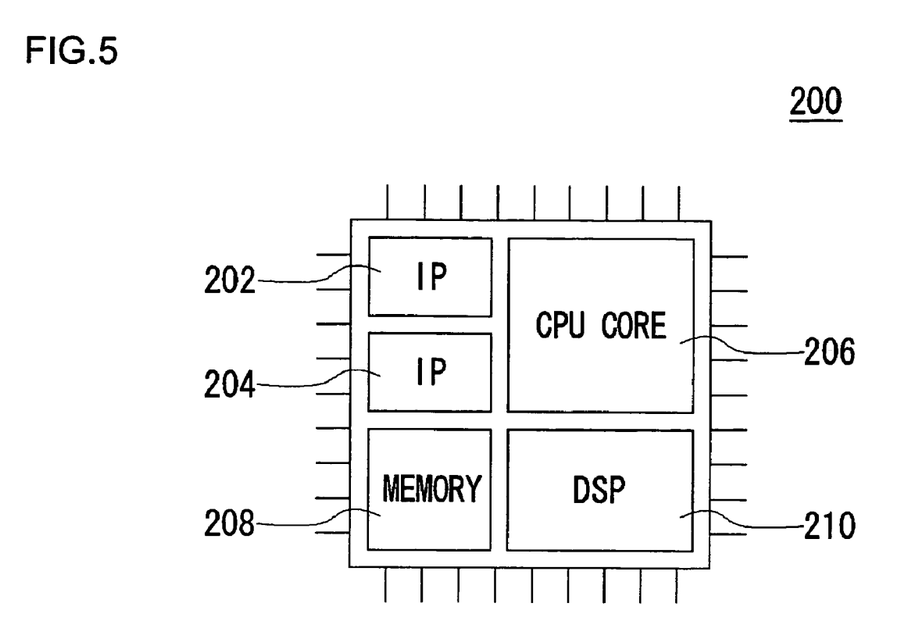
FIG. 5 is a diagram showing an example of circuit configuration of an LSI designed by the LSI maker terminal.

FIG. 5 shows an example of circuit configuration of an LSI designed by the LSI maker terminal 40. The LSI 200 contains an IP core 202 which is provided by an IP provider A, and an IP core 204, a CPU core 206, a memory 208, and a DSP 210 which are designed by the LSI maker 40. Incidentally, the IPs may be implemented in the form of software. In this case, programs loaded on the memory 208 are executed by the CPU core 206 to effect the IP functions.

Up to this point, the present invention has been described in conjunction with the embodiment thereof. The embodiment has been given solely by way of illustration. It will be understood by those skilled in the art that various modifications may be made to combinations of the foregoing components and processes, and all such modifications are also intended to fall within the scope of the present invention.

The embodiment has dealt with the case where the LSI maker 40 acquires IP data from the IP provider 30 and conducts layout, wiring, and verification. In another example, the IP provider 30 may acquire actual data necessary for verification from the LSI maker 40 and conduct layout, wiring, and verification. The actual data for verification includes, for example, delay times of individual gates, setup and hold times of flip-flops, and driving capacities of buffers. The data is determined with respect to each of LSI processes to be provided by the LSI maker 40. In this case, the layout and wiring unit 104 and the verification unit 106 are formed in the terminal of the IP provider 30. The IP data acquisition unit 102 acquires verified wiring data from the terminal of the IP provider 30. When the actual data for verification is transmitted to the IP provider 30 over the Internet 20, the terminal of the LSI maker 40 may further comprises an authentication unit, a database, an encryption unit, a transmission unit, and so on. The authentication unit authenticates the IP provider 30. The database contains authentication IDs, passwords, etc. The encryption unit encrypts the actual data for verification. The transmission unit transmits the actual data for verification. The actual data for verification is confidential data pertaining to the specification of LSI products of the LSI maker 40, and thus is provided only to those IP providers 30 in confidential agreement.

The terminal of the LSI maker 40 may further comprises a storing unit for storing the details of the agreement at the time of concluding the contract with the IP provider 30. Here, if the storing unit is consulted to find that the LSI maker 40 is contracted to take charge of layout, wiring, and verification, then the layout, wiring, and verification are performed by the layout and wiring unit 104 and the verification unit 106 in the terminal of the LSI maker 40. If the IP provider 30 is contracted to take charge, the actual data for verification is transmitted to the terminal of the IP provider 30 by a not-sown transmission unit.

The embodiment has dealt with the case where the LSI maker 40 performs logic design, logic verification, layout and wiring, and post-layout and -wiring verification of the LSI ordered from the set maker 50. In another example, these operations may be conducted by the set maker 50. In this case, the LSI maker 40 also provides the actual data for verification to the set maker 50. As in the foregoing example, the terminal of the LSI maker 40 may comprise such components as an authentication unit, a database, an encryption unit, and a transmission unit. A storing unit for storing the details of the contract with the set maker 50 may also be provided.

Although the present invention has been described by way of exemplary embodiments, it should be understood that many changes and substitutions may further be made by those skilled in the art without departing from the scope of the present invention which is defined by the appended claims.

What is claimed is:

1. A system for supporting development of an integrated circuit comprising:
a terminal of a providing agent of a functional block having a predetermined function, the functional block constituting part of an integrated circuit; and
a terminal of a manufacturing agent of an integrated circuit, wherein the terminal of the providing agent provides logic data on the functional block to the terminal of the manufacturing agent over a network based on a contract concluded with the manufacturing agent,
the terminal of the manufacturing agent comprises:
a verification unit which acquires the logic data, conducts layout, wiring, and verification on an integrated circuit of a predetermined process, and registers the integrated circuit of a predetermined process as a verified functional;
a design unit which presents the functional block registered in the library to a purchasing agent of the integrated circuit, and when the design unit receives an order for an integrated circuit incorporating the functional block registered in the library from the purchasing agent, the design unit acquires logic data on the integrated circuit including the functional block, conducts layout, wiring, and verification on an integrated circuit of a predetermined process, and outputs verified wiling data; and
a calculation unit which calculates a license fee of the functional block to be paid to the providing agent based on the contract when the integrated circuit is paid for by the purchasing agent.

2. A method for supporting development of an integrated circuit comprising:
in a terminal of a providing agent of a functional block having a predetermined function, the functional block constituting part of an integrated circuit, providing logic data on the functional block to a terminal of a manufacturing agent of an integrated circuit based on a contract concluded with the manufacturing agent;
in the terminal of the manufacturing agent, conducting layout, wiring, and verification on an integrated circuit of a predetermined process based on the logic data;
in the terminal of the manufacturing agent, registering the integrated circuit of a predetermined process as a verified functional block into a library;
in the terminal of the manufacturing agent, presenting the functional block registered in the library to a purchasing agent of an integrated circuit;
in a terminal of the purchasing agent, issuing an order for manufacturing of an integrated circuit incorporating the functional block to the terminal of the manufacturing agent;
in the terminal of the manufacturing agent, conducting layout, wiring, and verification on an integrated circuit of a predetermined process based on the logic data on the integrated circuit including the functional block ordered;
in the terminal of the manufacturing agent, outputting verified wiring data; and in the terminal of the manufacturing agent, calculating a license fee of the functional block to be paid to the providing agent.

3. An apparatus for supporting development of an integrated circuit comprising:

an acquisition unit which acquires logic data on a functional block having a predetermined function from a providing agent of functional blocks, the functional block constituting part of an integrated circuit;

a first layout and wiring unit which conducts layout and wiring on an integrated circuit of a predetermined process based on the logic data;

a first verification unit which verifies the layout and wiring by the first layout and wiring unit;

a registration unit which registers the integrated circuit of a predetermined process as a verified functional block into a library; and a presentation unit which presents the functional block registered in the library to a purchasing agent of an integrated circuit;

an order reception unit which receives an order for an integrated circuit including a functional block registered in the library from the purchasing agent;

a second layout and wiring unit which acquires logic data on the integrated circuit including the functional block, and conducts layout and wiring on an integrated circuit of a predetermined process;

a second verification unit which verifies the layout and wiring by the second layout and wiring unit; and an output unit which outputs data on the verified layout and wiring.

4. The apparatus for supporting development of an integrated circuit according to claim 3, further comprising:

an information storing unit which stores information for calculating a license fee of the functional block; and a calculation unit which calculates a license fee of the functional block incorporated in the integrated circuit ordered from the purchasing agent based on a calculation condition.

* * * * *